United States Patent
Hosokawa

(10) Patent No.: US 7,423,938 B2
(45) Date of Patent: *Sep. 9, 2008

(54) APPARATUS AND METHOD FOR RECORDING AND REPRODUCING ROM AND RAM DATA INTO MAGNETO-OPTICAL RECORDING MEDIUM

(75) Inventor: Tetsuo Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

This patent is subject to a terminal disclaimer.

(21) Appl. No.: 11/047,111

(22) Filed: Jan. 31, 2005

(65) Prior Publication Data

US 2005/0128887 A1 Jun. 16, 2005

Related U.S. Application Data

(63) Continuation of application No. PCT/JP02/08776, filed on Aug. 30, 2002.

(51) Int. Cl.
*G11B 11/00* (2006.01)

(52) U.S. Cl. .................. 369/13.02; 369/275.3

(58) Field of Classification Search ................ None
See application file for complete search history.

(56) References Cited

U.S. PATENT DOCUMENTS

| | | | | |
|---|---|---|---|---|
| 5,138,598 A | * | 8/1992 | Sako et al. | 369/13.35 |
| 6,215,758 B1 | * | 4/2001 | Horimai et al. | 369/275.3 |
| 6,223,247 B1 | * | 4/2001 | Otsuka et al. | 711/4 |
| 6,671,249 B2 | * | 12/2003 | Horie | 369/275.3 |
| 7,065,030 B2 | * | 6/2006 | Tachino et al. | 369/59.25 |
| 7,154,824 B2 | * | 12/2006 | Aoyama et al. | 369/47.5 |
| 7,313,056 B2 | * | 12/2007 | Hosokawa | 369/13.35 |
| 2005/0058028 A1 | * | 3/2005 | Aoyama et al. | 369/13.35 |
| 2005/0128888 A1 | * | 6/2005 | Hosokawa et al. | 369/13.54 |
| 2005/0141402 A1 | * | 6/2005 | Hosokawa | 369/275.3 |

FOREIGN PATENT DOCUMENTS

| | | |
|---|---|---|
| JP | 6-290546 | 10/1994 |
| JP | 7-014233 | 1/1995 |
| JP | 7-065375 | 3/1995 |
| JP | 11-085150 | 3/1999 |
| JP | 11-085151 | 3/1999 |
| JP | 2000-163755 | 6/2000 |
| JP | 2000-311439 | 11/2000 |

OTHER PUBLICATIONS

Chikazawa et al.; "One Method of Realization Relating to Concurrent ROM-RAM Optical Disk"; pp. 1319-1324; 1992 (full translation attached).

* cited by examiner

Primary Examiner—Tan X Dinh
(74) Attorney, Agent, or Firm—Greer, Burns & Crain, Ltd.

(57) ABSTRACT

Multiple recording and simultaneous regeneration are performed using a storage medium comprising phase pits and a recording layer so that ROM and RAM can be regenerated simultaneously. When data is recorded to RAM while regenerating ROM using the concurrent ROM/RAM recording medium, the start and the end of recording to RAM is controlled using the recording start and recording end signals of the ROM. Therefore the content recording position of the RAM with respect to the content of ROM can be equalized, the delay can be controlled, and the virtual session function and the multiple recording function can be easily implemented at low cost.

14 Claims, 11 Drawing Sheets

FIG. 9

| | ROM DETECT | RAM DETECT | LD FEEDBACK |
|---|---|---|---|
| ROM & RAM REPRODUCE SIMULTANEOUSLY | ROM2 | RAM | ROM1 |
| ROM REPRODUCE & RAM RECORDING SIMULTANEOUSLY | ROM1 | — | ROM2 |

APPARATUS AND METHOD FOR RECORDING AND REPRODUCING ROM AND RAM DATA INTO MAGNETO-OPTICAL RECORDING MEDIUM

CROSS-REFERENCE TO RELATED APPLICATIONS

This application is a continuation of international application PCT/JP02/008776, filed on Aug. 30, 2002.

TECHNICAL FIELD

The present invention relates to a multiple recording medium, recording/regeneration device and recording/regeneration method for performing multiple recording and simultaneous regeneration of content using a recording medium having both functions of ROM (Read Only Memory) by optical phase pits formed on a substrate and RAM (Random Access Memory) by a recording film, and more particularly to a multiple recording medium, recording/regeneration device and recording/regeneration method for decreasing incompatibility in simultaneous regeneration even if multiple recording is performed on one recording medium.

BACKGROUND ART

CD (Compact Disk) is now widely popular as a means for listening to music. Also as a device for recording and regenerating digital audio data, MD (Mini Disk) systems using magneto-optical media are proliferating. In an MD system, music stored on a CD can be recorded/regenerated.

In this way, conventionally music is generally enjoyed by purchasing a medium where music information is recorded as ROM, such as a CD, and the music is listed to, or by recording favorite music on an MD and listening to it.

Another way of enjoying music is playing music on an instrument. To record music played on an instrument and to regenerate it, an external microphone is attached to a recording device, such as an MD, music is played and recorded live, and is regenerated. In this case music played by an individual alone is recorded.

However most music is created by various instruments on which different parts are played, such as an orchestra or a band. Therefore in order for an individual player to play a part in an orchestra or band, such as the case of playing an instrument while listening to a CD, a separate device for recording must be provided to record that playing.

Also the recording device must be operated simultaneously, which is troublesome. In the case of a method of playing an instrument along with music that is being regenerated from a CD and recording it by an external input microphone, the adjustment of the volume balance between the regeneration of the CD and playing is difficult, which makes it extremely difficult to recording good quality music.

Multiple recording is performed to improve such shortcomings when recording music. In multiple recording, different music is recorded on each track of the recording medium, which has a plurality of recording tracks. In other words, music is recorded on the first track in advance, and sound is superimposed and recorded on another track while listening to the music on the first track being regenerated.

For example, a sound of piano is recorded first and a guitar sound is recorded next while listening to the sound of the piano, so that the piano and guitar can be simultaneously regenerated. In order to record while regenerating using a plurality of tracks, or to simultaneously regenerate music on a plurality of tracks, a high-speed and large capacity storage device is required, where for the most part a hard disk is used.

A multiple recording system using a hard disk which is aimed at producing music, however, requires advanced editing and demands complicated operation. Therefore a multiple recording system using a hard disk is used by a limited number of people, and is not commonly used as yet. Also a magnetic recording medium has no ROM section, such as the phase pits of an optical disk, so in order to record music, the music must be magnetically recorded for each disk, which increases the manufacturing cost.

As a medium which can be more easily handled than a hard disk, a multiple recording system using an MD (Mini Disk) has been implemented. Using an MD makes the medium less expensive, but the user must record music sequentially on a plurality of tracks, which is still the same as a device using a hard disk.

Also in order to record music information in advance before shipment, magneto-optical recording is required for each disk, just like the case of a hard disk, which increases the medium cost. Another problem is that recording capacity decreases because a plurality of tracks are used. Therefore a conventional multiple recording system using an MD for recording as well is used only by some specialists and not the general public.

As mentioned above, the conventional ways of enjoying music are limited to three: listening to music, playing music alone and recording and regenerating music alone, excluding some specialists.

A method of using a concurrent ROM/RAM medium, on the other hand, is a method of having the potential to implement multiple recording and simultaneous regeneration functions, which have been limited to some specialists at low cost.

For example, in Japanese Patent Application Laid-Open No. H7-65375, a method for using a medium comprising ROM and RAM, where music or image information is recorded on the ROM section formed by phase pits in advance, other music or image information is recorded in the RAM section at a same position as the recorded position of the ROM data with synchronizing with the regeneration of the music or image recorded in the ROM, was proposed.

In actual music recording however it is difficult to record RAM data at a same position as the recording position of the ROM data.

The first reason is that there is no means to know the timing to start playing an instrument. Generally each player of an instrument must start playing at the respective correct timing using a timing count means, such as a conductor. However in the case of multiple recording while regenerating music or an image of ROM, the recording side cannot know the timing, and the timing to start playing delays.

The second reasons is that the time delay is generated until the sound information reaches from the speaker to the player or singer in the case of playing a piano or guitar, or singing while listening to music output from a speaker by regenerating the ROM section of the medium. This delay becomes more obvious as the distance between the speaker and the player increases. Also the positional relationship between the sound source, such as a speaker, and the player or singer is not predetermined but is freely set by the user. Therefore it is difficult to perfectly align the position of the music in the ROM section and the recording position in the RAM section at recording.

This is not restricted to music, but is a common problem more or less for other content, such as images. Therefore it is necessary to implement a means for controlling displacement even if the positions of the ROM data and the corresponding RAM data deviate, or performing simultaneous regeneration even if displacement occurs.

DISCLOSURE OF THE INVENTION

With the foregoing in view, it is an object of the present invention to provide a multiple recording medium, recording/regeneration device and recording/regeneration method for implementing a virtual session function and a multiple recording function, which have been limited to some specialists thus far, at low cost, and regenerating music at sufficient quality.

It is another object of the present invention to provide a multiple recording medium, recording/regeneration device and recording/regeneration method for synthesizing and outputting with synchronizing timing of ROM and RAM even if the content is multiple-recorded in RAM while regenerating the recorded content of ROM.

It is still another object of the present invention to provide a multiple recording medium, recording/regeneration device and recording/regeneration method for multiple-recording the content in RAM synchronizing the recording timing with ROM while regenerating the recorded content in the ROM.

To achieve these objects, the multiple recording medium of the present invention has a substrate on which first content information is recorded as phase pits using light reflectance changes, a recording layer which is provided on the substrate and can be recorded and regenerated by light, and a buffer area, in which information for controlling the recording timing of the second content to be recorded in the recording layer along with the regeneration of the first content is formed as phase pits, and disposed before and after the content recording area where the first content information is recorded.

In the multiple recording medium of the present invention, it is preferable that the recording layer is constructed by a magneto-optical recording film.

The recording/regeneration device of the present invention has: an optical pickup for irradiating light onto a multiple recording medium where a recording layer, that can be recorded on and regenerated by light, is formed on a substrate in which first content information is recorded by phase pits using light reflectance changes, and separating and detecting information of the phase pits and the information of the recording layer; a magnetic recording head for recording information on the recording layer along with the irradiating light; a controller for recording second content information, which is input along with the regeneration of the first content information, on the recording layer according to the recording timing information added to the first content information, and regenerating the first content information of the phase pits and the second content information of the recording layer from the optical pickup; and an output mechanism for synthesizing and outputting the regenerated first and second content information with delaying at least one of them.

A recording/regeneration method of the present invention has steps of: irradiating light onto a multiple recording medium where a recording layer that is optically recordable/regeneratable is formed on a substrate in which first content information is recorded by phase pits using light reflectance changes; recording second content information, which is input along with the regeneration of the first content information of the phase pits on the recording layer according to the recording timing information added to the first content information; and regenerating the first content information of the phase pits and the second content information of the recording layer and synchronizing and outputting the regenerated first and second content information with delaying at least one of them.

In the present invention, when data is recorded to RAM while regenerating ROM using the concurrent ROM/RAM recording medium, the start and the end of recording to RAM is controlled using the recording start and end signals of ROM, therefore the content recording position of the RAM with respect to the content of the ROM can be equalized, and the delay can be controlled. By this, the virtual session function and the multiple recording function, which have been limited to some specialists, can be easily implemented at low cost.

In the multiple recording medium of the present invention, it is preferable that the timing information created in the buffer area further has signals for the recording start and the recording end of the second content information.

In the multiple recording medium of the present invention, it is preferable that the timing information created in the buffer area further has signals to indicate the time up to the start of the regeneration of the first content information.

In the recording/regeneration device of the present invention, it is preferable that the controller detects the signals for the recording start and the recording end of the second content information, which is the added recording timing information, from the phase pit information, and controlling the recording start and the recording end of the second content information to the recording layer.

In the recording/regeneration device of the present invention, it is preferable that the controller regenerates and outputs the signals to indicate the time until the regeneration start of the first content information included in the added recording timing information.

Also in the recording/regeneration method of the present invention, it is preferable that the recording step further has a step of detecting the signals for the recording start and the recording end of the second content information, which is the added recording timing information, from the phase pit information, and controlling the recording start and the recording end of the second content information to the recording layer.

In the recording/regeneration method of the present invention, it is preferable that the recording step further has a step of regenerating and outputting the signals to indicate the time until the regeneration start of the first content information included in the added recording timing information.

In the multiple recording medium of the present invention, it is preferable that the timing information created in the buffer area further has signals to indicate the timing of the second content information.

In the recording/regeneration device of the present invention, it is preferable that the controller adds the time information to the second content information to be recorded according to the signals to indicate the timing of the second content information included in the added timing information.

Also in the recording/regeneration device of the present invention, it is preferable that the controller compares the timing signal of the phase pit information and the time information added to the second content information of the recording layer, and controls the delay amount of the synthesis output mechanism.

Also in the recording/regeneration method, it is preferable that the synthesis output step further has a step of comparing the timing signal of the phase pit information and the time information added to the second content information of the recording layer, and controlling the delay amount of the synthesis output mechanism.

According to this aspect of the present invention, the time information of the recording data of the recording layer is added and the delay amount at synthesis is automatically controlled based on the time information which is set in the phase pits, so the delay can be adjusted automatically.

In the multiple recording medium of the present invention, it is preferable that the first content information formed by the phase pits is music information converted into digital audio signals.

In the recording/regeneration device of the present invention, it is preferable that the synthesis output mechanism further has means for adjusting the output ratio of the regenerated first and second content information.

In the recording/regeneration device of the present invention, it is preferable that the synthesis output mechanism further has means for adjusting the waveforms of at least one of the regenerated first and second content information.

BRIEF DESCRIPTION OF THE DRAWINGS

FIG. 9 is a table showing the combination of the ROM and the RAM in each regeneration and recording mode in the main controller in FIG. 8;

DESCRIPTION OF THE PREFERRED EMBODIMENTS

Embodiments of the present invention will now be described in the sequence of the content multiple recording/regeneration system, content multiple recording medium, multiple recording/regeneration device and other embodiments. In the following embodiments, music information is described as an example, but the content is not limited to music, and the present invention can also be applied to image and other content.

Content Multiple Recording/Regeneration System

Figure 1:
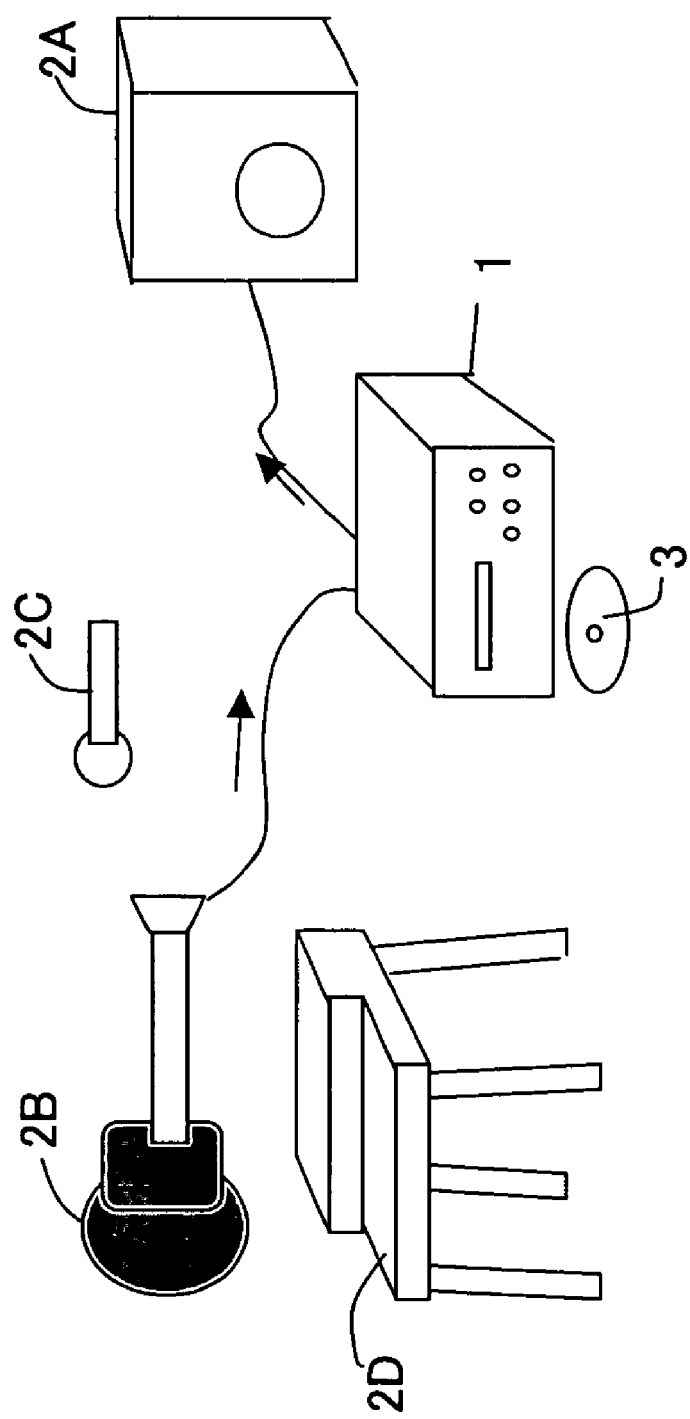
FIG. 1 is a diagram depicting the configuration of the content recording/regeneration system according to an embodiment of the present invention.
Figure 2:
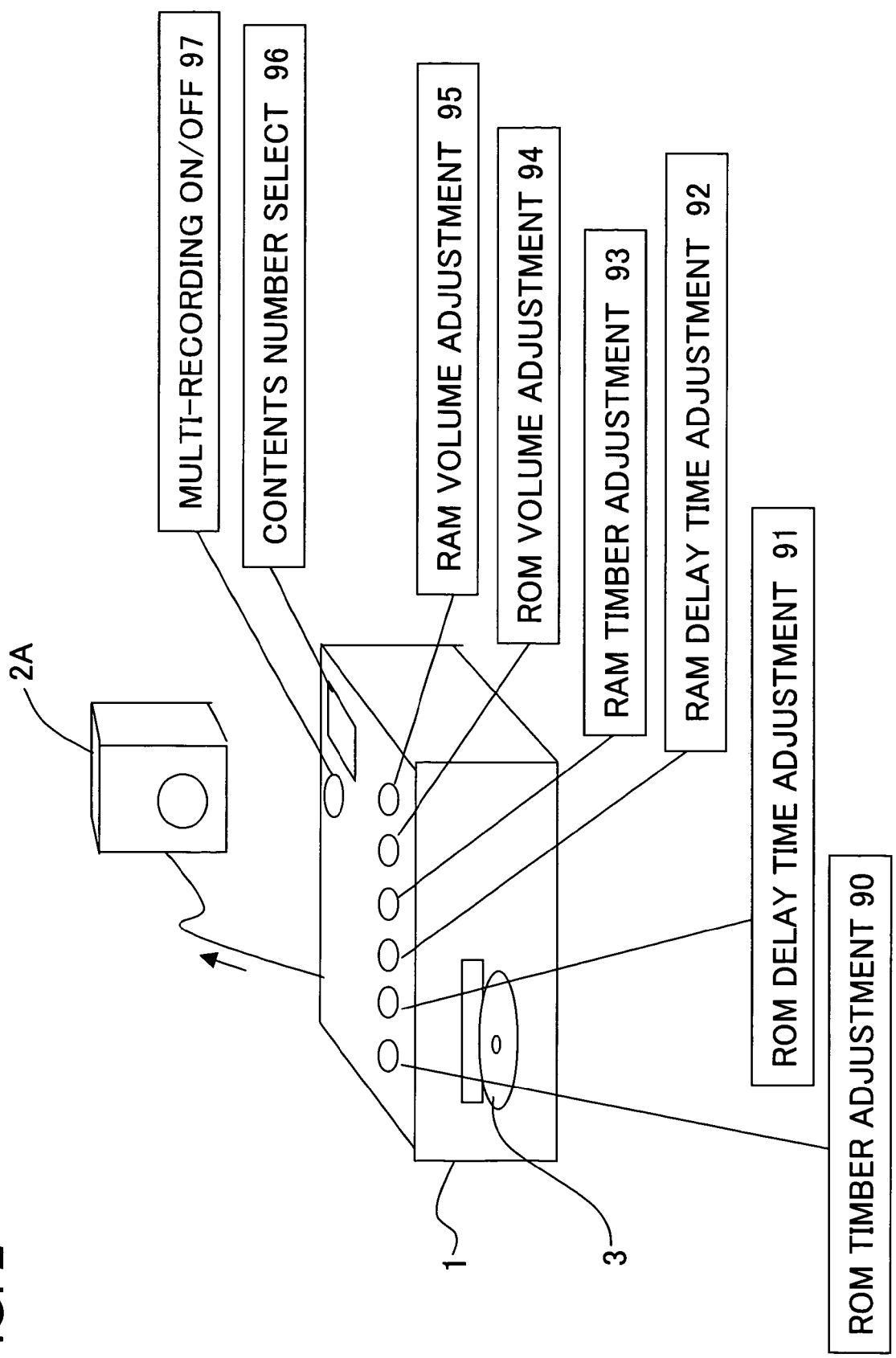
FIG. 2 is a detailed diagram depicting the content recording/regeneration system in FIG. 1.

FIG. 1 and FIG. 2 are diagrams depicting the content multiple recording/regeneration system according to an embodiment of the present invention. Music will be described as an example of the content.

First a method for recording music information according to the present invention will be described with reference to FIG. 1. In FIG. 1, with such instruments as a guitar 2B and a piano 2D, music signals converted into electric signals are output from the instruments. The music signals output from these instruments are input to the recording/regeneration device 1, converted into digital signals by the A/D converter, and then recorded to the later mentioned magneto-optical recording medium 3.

At this time the music ROM information recorded as phase pits in advance, for example, is read to the same magneto-optical recording medium 3, and is regenerated and output to the speaker 2A. This ROM information may be performed by a band, such as drums, bass, guitar, and a chorus and vocalist, other than a part played by the instrument of the user, or may be performed by an orchestra. Or a rhythmic sound at a predetermined interval may be used.

In any case the instrument is played while listening to the music information recorded in the ROM of the recording medium 3. In other words, a virtual session with a band or orchestra, as a pseudo-member thereof, is implemented. And at the same time with the regeneration of this music ROM information, the performance of the instrument is recorded on the magneto-optical layer of the same magneto-optical recording medium 3.

In FIG. 1 the signal to be input to the recording/regeneration device 1 is shown by a sound signal from the guitar 2B, but may be a signal of the piano 2D, or vocal microphone 2C or a synthesized signal of these instruments.

This input signal is recorded in the RAM area based on the magneto-optical recording film of the later mentioned concurrent ROM/RAM medium 3. The output signals of the speaker 2A are the regeneration signals of the music information which has been recorded in the medium 3 as ROM in advance. These ROM music regeneration signals are input to the output equipment 2A, such as a speaker and headphone.

The output of the guitar, piano and microphone may be output to a separate speaker (not illustrated), or may be synthesized to be ROM music regeneration signals and output to the same speaker 2A. The speaker 2A in FIG. 1 may be built into the recording/regeneration device 1.

Figure 3:
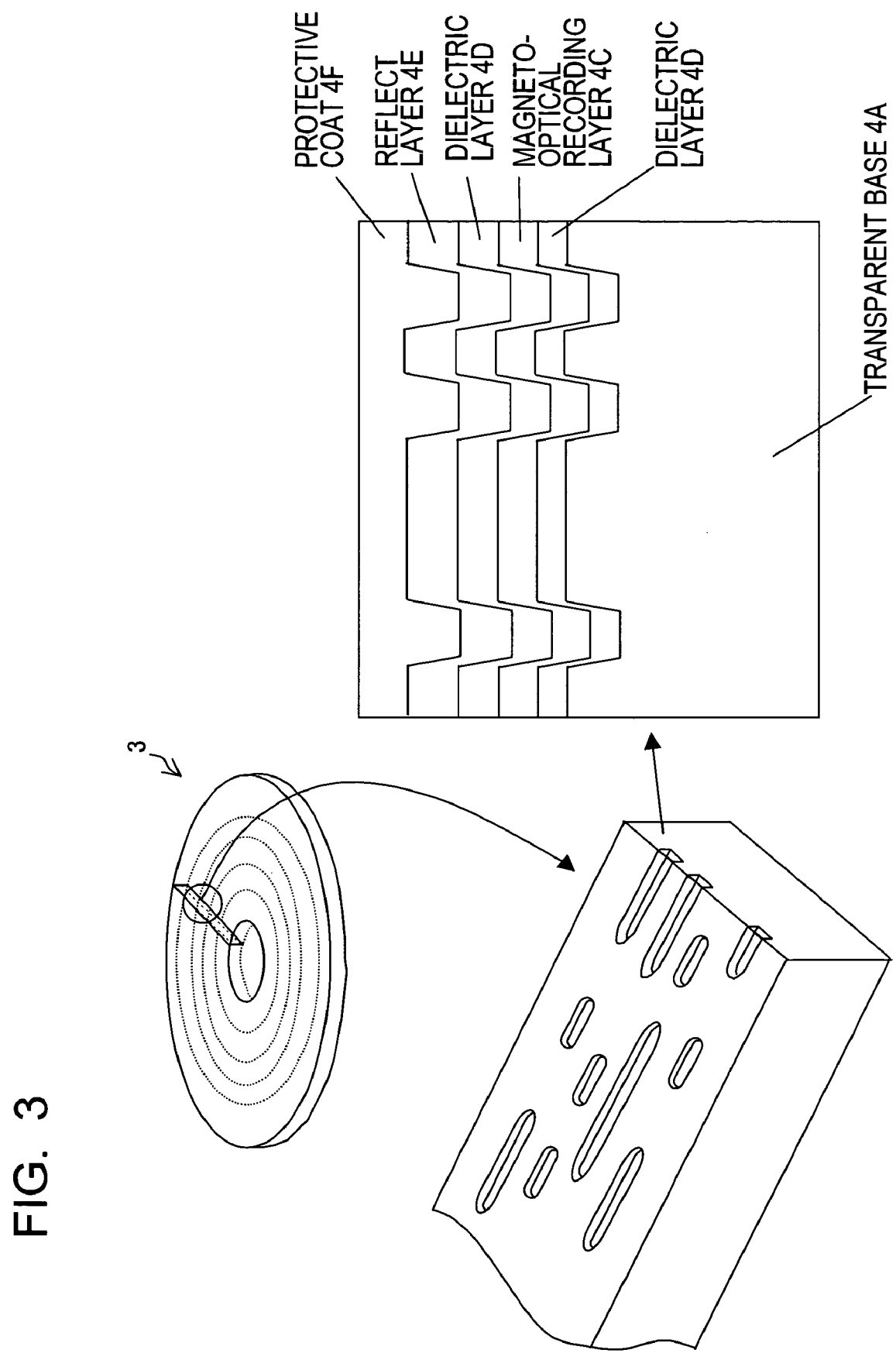
FIG. 3 is a diagram depicting a magneto-optical disk as an example of the optical recording medium to be used for the system in FIG. 1.

A medium effective for the music multiple recording and simultaneous regeneration of the present example is, for example, the medium 3, where a recording film including the magneto-optical recording layer is formed on the bumps of the phase pit information that cannot be physically erased, as shown in FIG. 3.

When such a medium 3 is used, the RAM signals can be superimposed and recorded over the ROM signals, and the ROM can be simultaneously regenerated. When the ROM and RAM signals are superimposed and recorded, the recording areas of the ROM section and the RAM section roughly match within the medium of each song, but if this is more closely examined, magneto-optical recording data is recorded at a position that is shifted in timing with respect to the phase pit section due to the above mentioned reasons.

Now the simultaneous regeneration method of ROM music and RAM music according to the present invention will be described with reference to FIG. 2. The recording/regeneration device 1 has a mechanism for regenerating the music recorded in the ROM of the recording medium 3 and performing multiple recording with playing an instrument while listening to this music.

In other words, the recording/regeneration device 1 has a content select section 96 for the music title and music number. Also by pressing the multiple recording button 97, the device enters the recording mode, and starts multiple recording with linking with the content regeneration in timing.

Also because of the positional relationship between the sound source 2A, such as a speaker, and the player or singer, the data recorded in the RAM of the medium 3 is recorded with a shift for the amount of delay as relating data in the ROM of the medium 3. This shift, in some cases, may be large enough to cause a defect in music regeneration.

Therefore the delay is adjusted by adding a delay time adjustment function to the ROM signals. The delay time can be freely adjusted by the user according to the distance in playing using the ROM delay time adjustment section 91. Delay time may be fixed in advance depending on the application.

In the same way the delay can be adjusted by adding the delay time adjustment function to the RAM signals. The delay time can be freely adjusted by the user according to the distance in playing using the RAM delay time adjustment section 92. The delay time may be fixed in advance depending on the application.

The detection method of the ROM information and the RAM information are different from each other, as described later, so each is regenerated and amplified separately. By adjusting the amplification gain of the ROM section and the RAM section separately, the ratio of the sound volume of the performance of a band and orchestra, and the sound volume of the performance of an instrument newly recorded and added can be changed. Also by changing the regeneration waveform, the sound quality of the performance of an instrument can be changed in various ways.

The ROM sound volume adjustment section 94 and the RAM sound volume adjustment section 95 are installed for the user to adjust the sound volume of the ROM and the RAM respectively, and the ROM sound quality adjustment section 90 and the RAM sound quality adjustment section 93 are installed for the user to adjust the sound quality of the ROM and the RAM respectively.

Since the sound volume ratio and the sound quality can be adjusted at regeneration, comprehensive balanced music regeneration is possible. And since the performance of a band and orchestra is recorded in batch in the ROM section of the medium 3, instead of on a plurality of tracks assigned to each instrument, complicated sound volume and sound quality adjustment, which was demanded for conventional multi-track recording, are not required, and high quality music can be listened to easily.

The simple performance of a single instrument may be recorded in the ROM section of the medium 3 in advance with certainty. For the sound quality adjustment, the adjustment method can be changed to the optimum according to the instruments to be used. For example, in the case of a guitar, the sound may be adjusted to sound distorted.

Content Multiple Recording Medium

Figure 4:
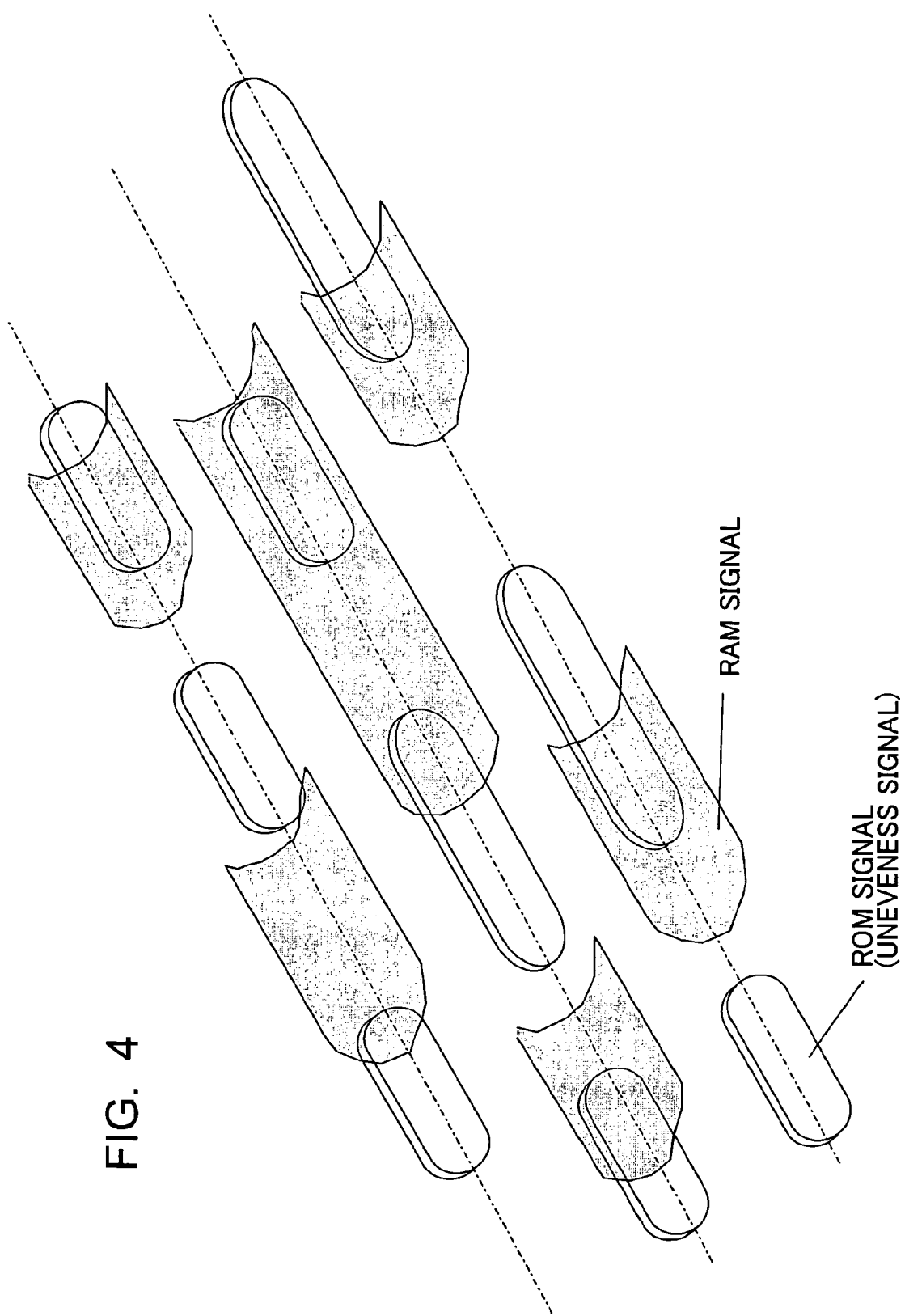
FIG. 4 is a perspective view depicting the recording status of the ROM information and the RAM information in the optical recording medium with the structure in FIG. 3.

FIG. 3 is a diagram depicting the content recording medium according to an embodiment of the present invention, and FIG. 4 is a diagram depicting the relationship between a ROM signal and a RAM signal thereof.

In the description in FIG. 3 and later, a ROM-RAM magneto-optical disk (MO) will be described as an example of the content recording medium. As FIG. 3 shows, the ISO standard magneto-optical disk 3 has a disk shape, where the read-in area is created in the innermost circle, and the read-out area is created in the outermost circle, and the user area is created in between them.

The read-in area and the read-out area are ROM information areas comprised of phase pits, which are formed as bumps on a polycarbonate substrate, where such information as disk specifications is recorded. The conditions of recording/regeneration are controlled by reading this information. The optical depth of the phase pits (pit depth) to become this ROM information is set such that the light intensity modulation during regeneration reaches the maximum. Generally the degree of modulation (ratio of the change of light intensity in the phase pit area with respect to the light intensity in the flat area) is set to 70% or more.

The user area, where the magneto-optical recording film is formed by a sputtering device, is created between the read-in area and the read-out area. A user can freely record/regenerate information in this user area.

In order for the user area to have ROM and RAM functions, the magneto-optical disk 4 is generally comprised of a first dielectric layer 4B made of such material as silicon nitride and tantalum oxide, a magneto-optical recording layer 4C made of an amorphous alloy of a rare earth metal, such as TbFeCo, and a transition metal, a second dielectric layer 4D made of materials which are the same as those of the first dielectric layer 4B, a reflection layer 4E made of such metals as AlTi and Au, and a protective coat layer 4F made of ultraviolet hardening resin on a transparent (polycarbonate) substrate 4A where phase pits are formed, as FIG. 3 shows.

As FIG. 3 and FIG. 4 show, the ROM function is provided by the phase pits PP formed by bumps on the disk 3, and the RAM function is provided by the magneto-optical recording layer 4C. To record data onto the magneto-optical recording layer 4C, a laser beam is irradiated onto the magneto-optical recording layer 4C to assist magnetization inversion, and magneto-optical signals OMM are recorded by inverting the direction of the magnetization corresponding to the signal magnetic field. By this, the RAM information can be recorded.

A weak laser beam is irradiated onto the recording layer 4C to read the recorded information on the magneto-optical recording layer 4C, which changes the plane of the polarization of the laser beam by the polar Kerr effect according to the magnetization direction of the recording layer 4C, and the presence of signals is judged by the intensity of the polarization components of the reflected light at this time. By this, the RAM information can be read. In this reading, the reflected light is modulated by the phase pits PP constituting the ROM, so the ROM information can be read simultaneously.

In an optical information recording medium having such a structure, the ROM information is fixed-recorded by the phase pits PP, which are bumps formed on a flat substrate, and the RAM information is recorded on the magneto-optical recording layer on the phase pit PP lines as RAM signals MO, as shown in FIG. 4.

In this optical recording medium, ROM and RAM can be simultaneously regenerated by one optical pickup, and if a magnetic field modulation type magneto-optical recording is used, the writing of RAM and the regeneration of ROM can be implemented simultaneously.

Figure 5:
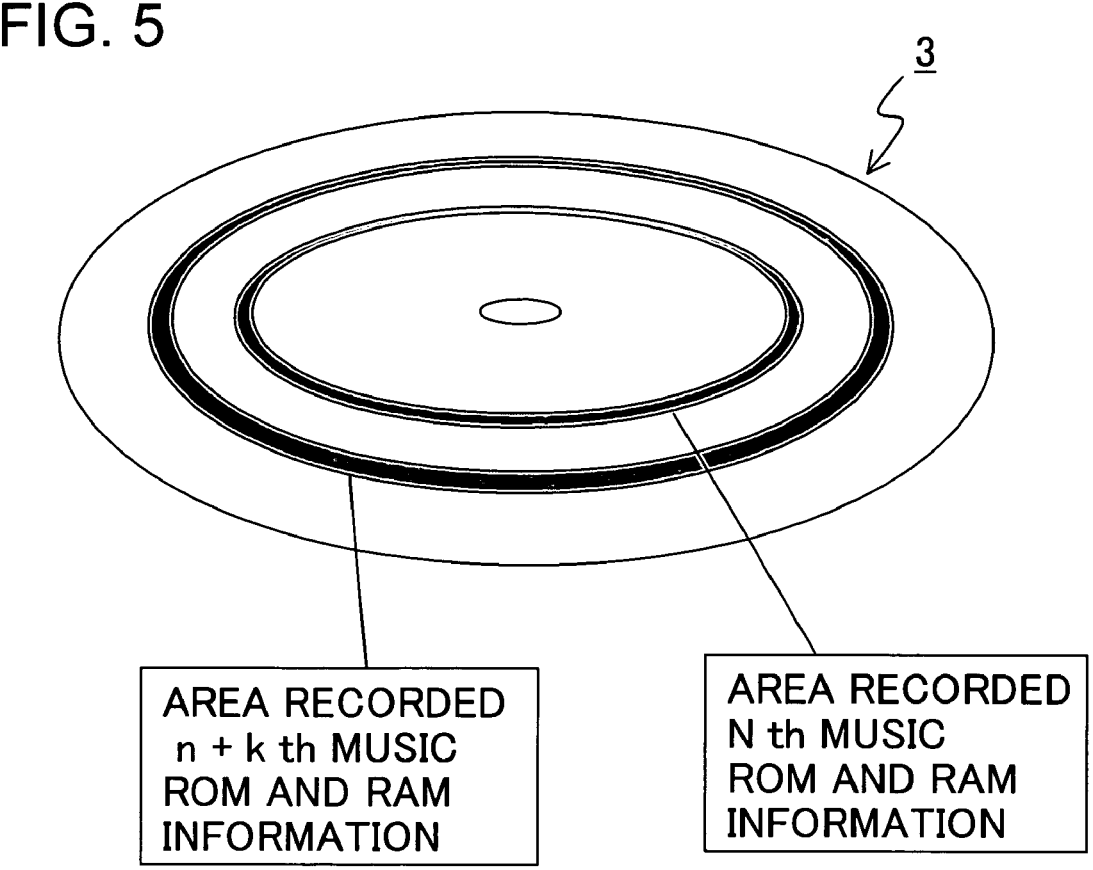
FIG. 5 is a diagram depicting the multiple recording status of the optical recording medium in FIG. 3.

FIG. 5 is a conceptual diagram depicting the recording status of the optical disk medium in FIG. 3 and FIG. 4. As FIG. 5 shows, a plurality of content is recorded in advance by phase pits as ROM on the recording medium 3. The RAM information is recorded on the recording film including the magneto-optical recording layer formed on the phase pit information that is physically non-erasable bumps.

Figure 6:
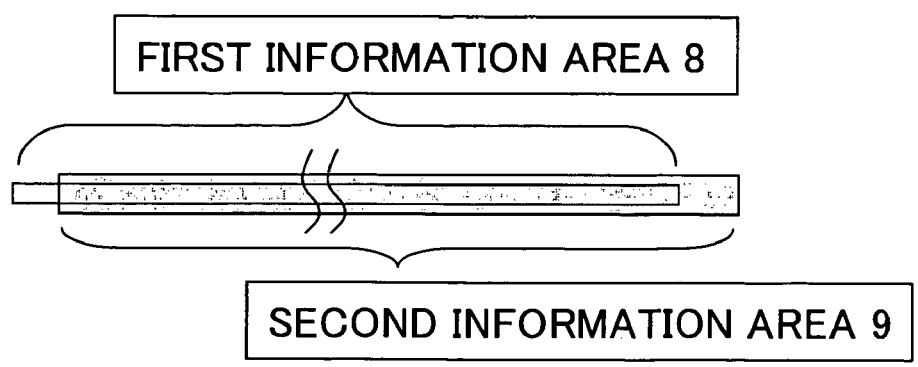
FIG. 6 is a diagram depicting the relationship between the phase pit area and the magneto-optical RAM recording area of each content in FIG. 5.

When this medium is used, RAM signals can be superimposed and recorded on the ROM signals, and ROM and RAM can be simultaneously regenerated, as FIG. 6 shows.

FIG. 5 is a conceptual diagram when music multiple recording is performed on the ROM and RAM signals superimposing recording medium 3, as described in FIG. 3 and FIG. 4. The recording areas of the ROM section and the RAM section roughly match within the medium for each song, but when this is more closely examined, the magneto-optical recording data 9 is recorded at a position shifted in timing with respect to the phase pit section 8, due to the above mentioned reasons.

Figure 7:
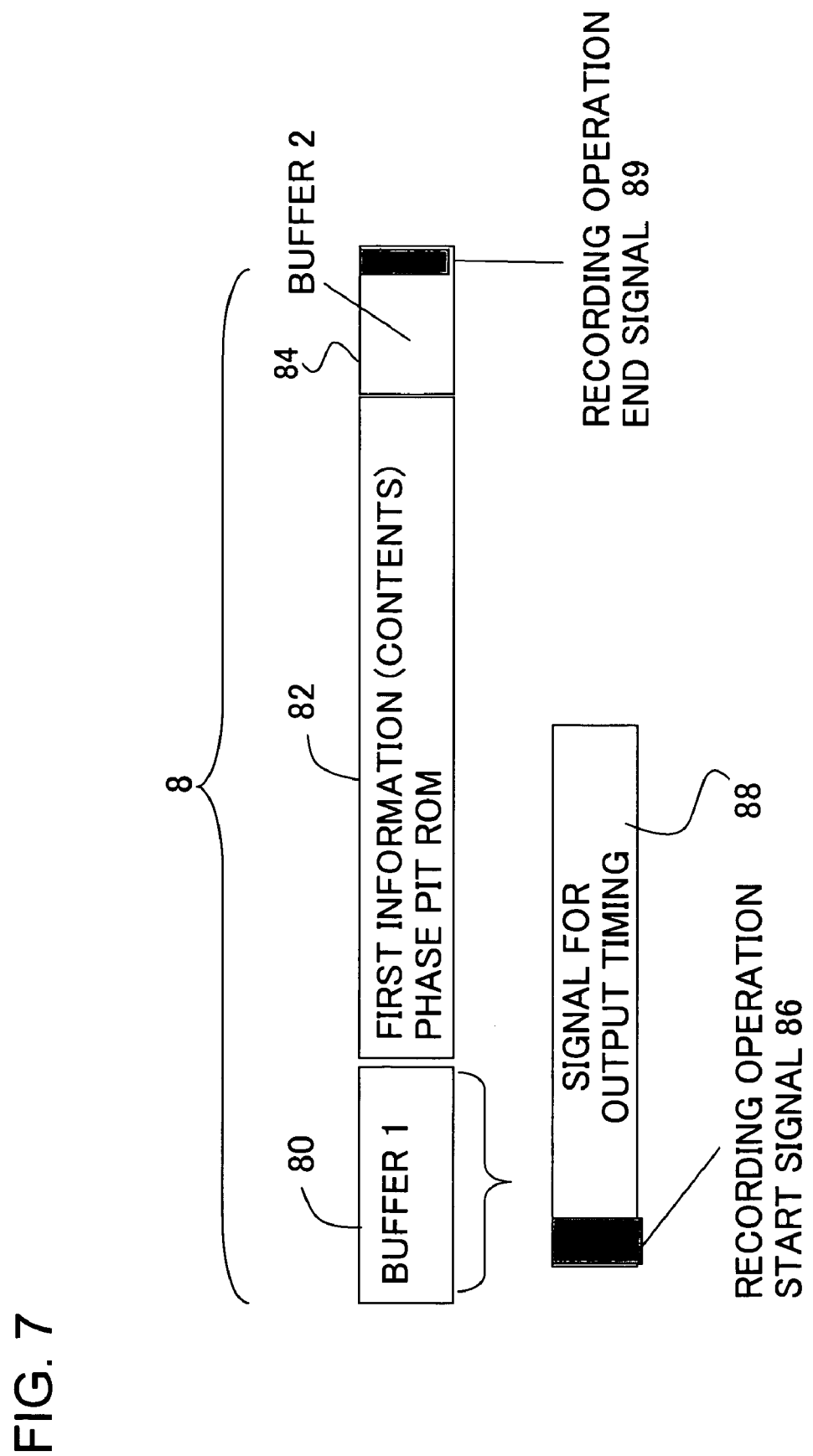
FIG. 7 is a diagram depicting the configuration of the phase pit area in FIG. 6.

In order to equalize or to adjust this shift, the data structure of the recording area (each contents, such as a song) of the ROM is constructed as in FIG. 7. In other words, the recording area 8 has two buffer areas, 80 and 84, before and after the content data area 82. In this case, the buffer 80 is positioned before the content data area 82 and the buffer 84 is position after the content data area 82 in terms of time.

In the buffer 80, the recording operation start instruction 86 is recorded. When the user depresses the multiple recording button 97 of the recording/regeneration device 1 in FIG. 2, recording start becomes possible, and the recording status starts when the recording start instruction 86 in the buffer 80 is received.

In the buffer 80, the timing signal 88, which is unique for each content, is recorded. This timing signal 88 is a signal to be output as voice, as a counter to start a performance. For example, "1", "2", "3" and "Start" can be shouted. This information may be displayed on a screen.

If a Q channel code, used for a CD, is added to the RAM information, the timing signal may be used for the information to control the timing of an addition.

In the buffer 84, the signal 89, to start the recording operation end instruction, is recorded. The recording position of this signal is at a rear position in terms of time, corresponding to the above mentioned delay time shown in FIG. 6. When the recording operation end instruction 89 is received, the recording operation to the magnetic head ends.

Content Multiple Recording/Regeneration Device

Figure 8:
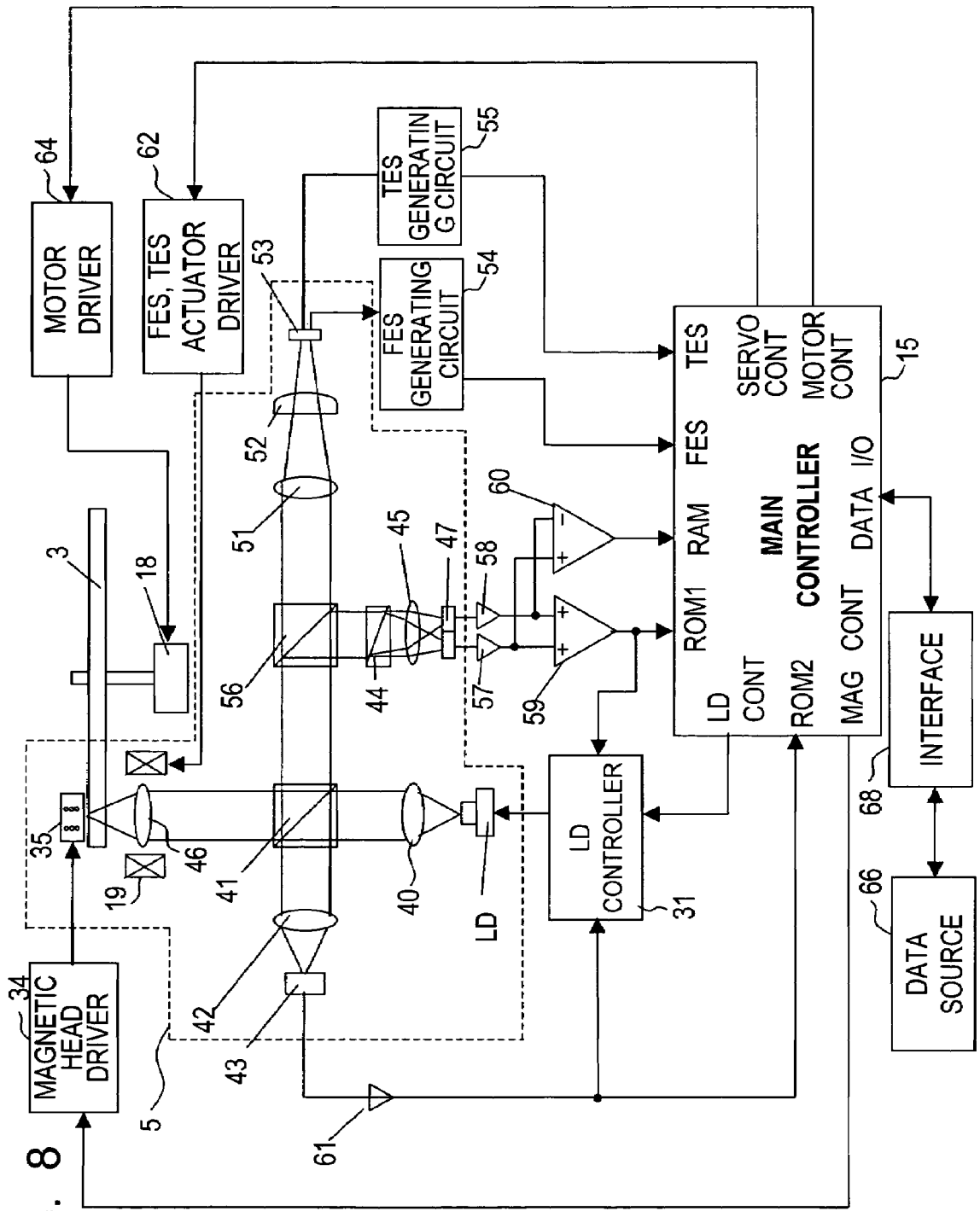
FIG. 8 is a block diagram depicting an embodiment of the recording/regeneration device of the present invention.

Now the optical disk drive, which is the content recording/regeneration device 1 according to the present invention, will be described. FIG. 8 is a block diagram depicting an entire optical disk drive according to an embodiment of the present invention, and FIG. 9 is a table showing each mode of the optical disk drive.

As FIG. 8 shows, the spindle motor 18 rotates the optical information recording medium (MO disk) 3. Normally the MO disk 3 is a removable medium, and is inserted through a slot of the drive, which is not illustrated. The optical pickup 5 has the magnetic head 35 and the optical head, which are disposed so as to sandwich the optical information recording medium 3.

The optical pickup 5 can be moved by the track actuator (not illustrated), such as a ball screw feed mechanism, so as to access an arbitrary position on the optical information recording medium 3 in the radius direction. The optical pickup 5 also has an LD driver 31 for driving the laser diode LD of the optical head, and the magnetic head driver 34 for driving the magnetic head 35 of the optical pickup 5.

The main controller 15 is comprised of a servo controller for access, and a controller. The servo controller servo-controls the track actuator, the motor 18, and the focus actuator 19 of the optical head according to the output from the optical head. The controller operates the LD driver 31, magnetic head driver 34 and servo controller for access, to record and regenerate information.

Details of the optical head will be described with reference to FIG. 8. The diffused lights from the laser diode LD become parallel lights by the collimator lens 40, and are condensed on the optical information recording medium 3 by the objective lens 46 almost up to the diffraction limit via the polarization beam splitter 41.

A part of the lights that enter the polarization beam splitter 41 are reflected by the beam splitter 41, and are condensed to the APC (Auto Power Control) detector 43 via the condensing lens 42.

The lights reflected by the optical information recording medium 3 enter the beam splitter 41 again via the objective lens 46. A part of the lights, which reentered the beam splitter 41, return to the laser diode LD side, and the remainder of the lights are reflected by the beam splitter 41 and enter the polarization beam splitter 56.

A part of the lights which entered the polarization beam splitter 56 are condensed on the two-division detector 47 via the two-beam Wollaston prism 44 and the condensing lens 45. The remainder of the lights which entered the polarization beam splitter 56 are condensed on the four-division detector for servo detection 53 via the condensing lens 51 and the cylindrical face lens 52.

The FES (Focus Error Signal) regeneration circuit 54 detects a focus error (FES) by the astigmatism method by using the photo-electric converted outputs A, B, C and D of the four-division photo-detector 53. In other words, $$FES=(A+B)-(C+D)/(A+B+C+D).$$

At the same time, the track error (TES) is detected from the output of the four-division detector 53 by the TES generation circuit 55 based on the push-pull method.

The focus error signals (FES) and the track error signals (TES) determined by these calculations are input to the main controller (specifically the servo controller for access) as position error signals in the focus direction and in the track direction.

In the recording information detection system, on the other hand, the polarization characteristics of the reflected laser light, which change depending on the magnetization direction of the magneto-optical recording on the optical information recording medium 3, are converted into light intensity. In other words, in the two-beam Wollaston prism 44, the laser beam is separated into two beams, of which the polarization directions are perpendicular to each other, by the polarization detection, two beams enter the two-division photo-detector 47 through the condensing lens 45, and are photo-electric converted respectively.

The two electric signals G and H, after photo-electric conversion by the two-division photo-detector 47, are amplified by the amplifiers 57 and 58, then are added by the addition amplifier 59 and become the first ROM signal (ROM 1=G+H), and at the same time are subtracted by the subtraction amplifier 60, and become the RAM read (MO) signal (RAM=G−H), and both are input to the main controller 15 respectively.

The reflected lights of the semiconductor laser diode LD, which entered the photo-detector for APC 13, are photo-electric converted and enter the main controller 15 as the second ROM signal (ROM 2) via the amplifier 61.

Also as described above, the first ROM signal (ROM 1), which is the output of the addition amplifier 29, the RAM signal (RAM), which is the output of the differential amplifier 30, the focus error signal (FES) from the FES generation circuit 27, and the track error signal (TES) from the TES generation circuit 24 are input to the main controller 15.

Also the recording data and the reading data are input/output between the main controller 15 and the data source 66 via the interface circuit 68.

The first ROM signal (ROM 1=G+H), the second ROM signal (ROM 2=I) and the RAM signal (RAM=G−H) to be input to the main controller 15 are detected and used according to each mode, that is ROM and RAM simultaneous regeneration, ROM regeneration and RAM simultaneous recording (WRITE).

FIG. 9 is a table showing the combination of ROM 1 (=G+H), ROM 2 (=I) and RAM (G−H) in each mode. The main controller 15 generates a command signal for the LD driver 31 according to each mode. According to the command signal, the LD driver 31 performs negative-feedback control of the emission power of the semiconductor laser diode LD based on the first ROM signal (ROM 1=G+H) at ROM and RAM regeneration, and performs negative-feedback control of the emission power of the semiconductor laser diode LD based on the second ROM signal (ROM 2=I) at RAM recording.

At magneto-optical (RAM) recording, data from the data source 66 is input to the main controller 15 via the interface 68. When the magnetic field modulation recording system is used, the main controller 15 supplies this input data to the magnetic head driver 34. The magnetic head driver 34 drives the magnetic head 35 and modulates the magnetic field according to the recorded data.

At this time in the main controller 15, a signal to indicate recording is sent to the LD driver 31, and the LD driver 31 performs negative-feedback control for the emission of the semiconductor laser diode LD so as to be the optimum laser power for recording according to the second ROM signal (ROM 2=I).

When the light modulation recording system is used, this input data is sent to the LD driver 31, and drives the laser diode LD for light modulation. At this time in the main controller 15, a signal to indicate recording is sent to the LD driver 31, and the LD driver 31 performs negative-feedback control for the emission of the semiconductor laser diode LD so as to be the optimum laser power for recording according to the second ROM signal (ROM 2=I).

The main controller (specifically the servo controller) drives the focus actuator 19 according to the detected focus error signal FES to perform focusing control of the optical beam. The main controller 15 (specifically the servo controller) also drives the track actuator according to the detected track error signal TES to perform seek and track follow-up control of the optical beam.

In this case the signals G+H (ROM 1) of the detector 47 or I (ROM 2) of the detector 43 is used for laser power adjustment. When a ROM signal and a RAM signal are simultaneously regenerated, as shown in FIG. 9, then laser power is controlled for the signal G+H to be constant, so that the ROM read signal (=G−H) does not receive cross-talk from the phase pit modulation of the optical information recording medium 3. ROM is not detected during light modulation recording.

The recording/regeneration device 1 shown in FIG. 8 and FIG. 9 has an optical pickup for reading information of the ROM and RAM, and a magnetic head for recording information in the RAM. In this configuration, the RAM signals can be regenerated while regenerating ROM.

Also by the negative-feedback of the ROM 1 signal to the laser drive section, intensity modulation noise to the RAM signal, due to the bumps of the ROM section of the recording medium, can be decreased, so RAM signals can be accurately detected. In this case the ROM signals can be detected by ROM 2. The optical pickup can access an arbitrary position in the radius direction of the recording medium by the seek mechanism based on a ball screw feed mechanism. Therefore the optical pickup can freely access the content recorded on the ROM and the content recorded on the RAM.

Figure 10:
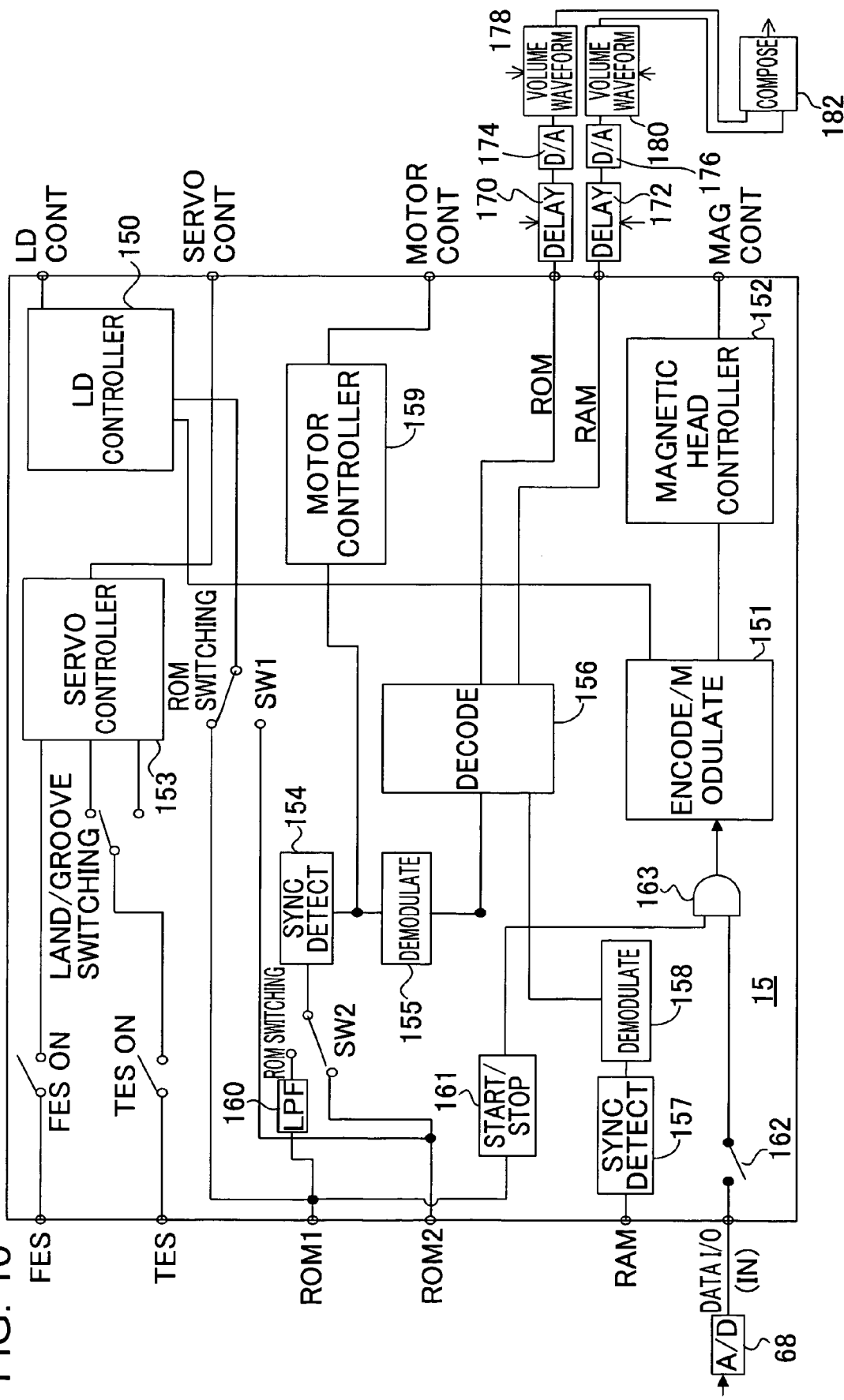
FIG. 10 is a block diagram depicting the first embodiment of the main controller in FIG. 8.

FIG. 10 is a block diagram depicting the first embodiment of the main controller 15 in FIG. 8. To the main controller 15, the second ROM signal (ROM 2), first ROM signal (ROM 1) which is the output of the addition amplifier 59, RAM signal (RAM) which is the output of the differential amplifier 60, focus error signal (FES) from the FES generation circuit 54 and track error signal (TES) from the TES generation circuit 55 are input via the amplifier 61.

Also the recording data converted into digital audio signals is input between the main controller 15 and the data source 66 via the interface circuit 68 including the AD converter.

In the main controller 15, the output of the differential amplifier 60, which is RAM information when ROM information and RAM information are simultaneously regenerated, is synchronously detected by the synchronous detection circuit 157, demodulated using a demodulation method corresponding to NRZI modulation for example, by the demodulator 158, decoded by the decoder 156, and are output as digital audio RAM signals.

In ROM/RAM simultaneous regeneration, on the other hand, ROM 2 is used for ROM signals. ROM 2 signals as well are synchronously detected by the synchronous detection circuit 154, just like the case of RAM signals, are converted into digital audio signals by the demodulator 155 and the decoder 156, and are output as ROM data.

In this case the RAM signals are delayed in being output, as described above, so the delay of a ROM signal is adjusted if necessary by the delay unit 170. This delay time may be freely adjusted by the user, as mentioned above. RAM signals are also delayed if necessary by the delay unit 172.

ROM signals and RAM signals which are output are converted into analog music signals by the D/A converters 174 and 176 respectively, then are input to the sound volume and sound quality adjustment circuits 178 and 180 respectively, then are adjusted by the user according to an instruction of the adjustment section in FIG. 2. Then the adjusted signals are synthesized by the synthesizer 182, and are output to the speaker and headphone 2A as music.

In this way the music of ROM and the music of RAM are simultaneously regenerated, synthesized and output. The delay at recording is adjusted by the delay units 170 and 172.

In ROM regeneration and RAM recording, ROM 1 signals are used as regenerated ROM signals, as shown in FIG. 9. By switching switch SW2, the ROM 1 signals are synchronously detected by the synchronous detection circuit 154 via the low pass filter 160, converted into digital audio signals by the demodulator 155 and decoder 156, and are output as ROM data.

The ROM data is converted into analog music signals by the D/A converter 174 via the delay unit 170, then is input to the sound volume and sound quality adjustment circuit 178, and is adjusted by the user according to an instruction of the adjustment section in FIG. 2. Then the adjusted data is synthesized by the synthesizer 182, and is output to the speaker and headphone 2A as music.

In order to record music, such as by guitar and voice, to the RAM while listening to this music, the input switch 162 is first turned ON by the above mentioned multiple recording switch 97. Also the start instruction of the buffer 80 of the ROM area 8 is detected by the start/stop detection circuit 161, and the gate 163 is opened.

By this, the analog music signals which are output from the guitar 2B and the piano 2D, or voice signals which are output from the microphone 2C, are converted into digital signal by the A/D converter 68, encoding for error correction is performed by the encoder 151. Then the encoded signals are converted into such signals as EFM and NRZI by the modulator 151, the magnetic head 35 is driven by the magnetic head controller 152 by the signal, thereby the signals are recorded in the RAM section 9 of the recording medium 3.

Since input to RAM is enabled by the start instruction of the buffer 80 of the ROM area 8 and recording is ended by the end instruction, the positional relationship of recording between the content of ROM and the content of RAM is equalized.

Also as described in FIG. 7, the regeneration timing of the ROM data can be known by a shout or an image of the timing signal of the buffer 80 of the ROM area 8, so the player can start playing or singing synchronizing with the ROM music. This can improve the effect of the virtual session function and the multiple recording function.

Figure 11:
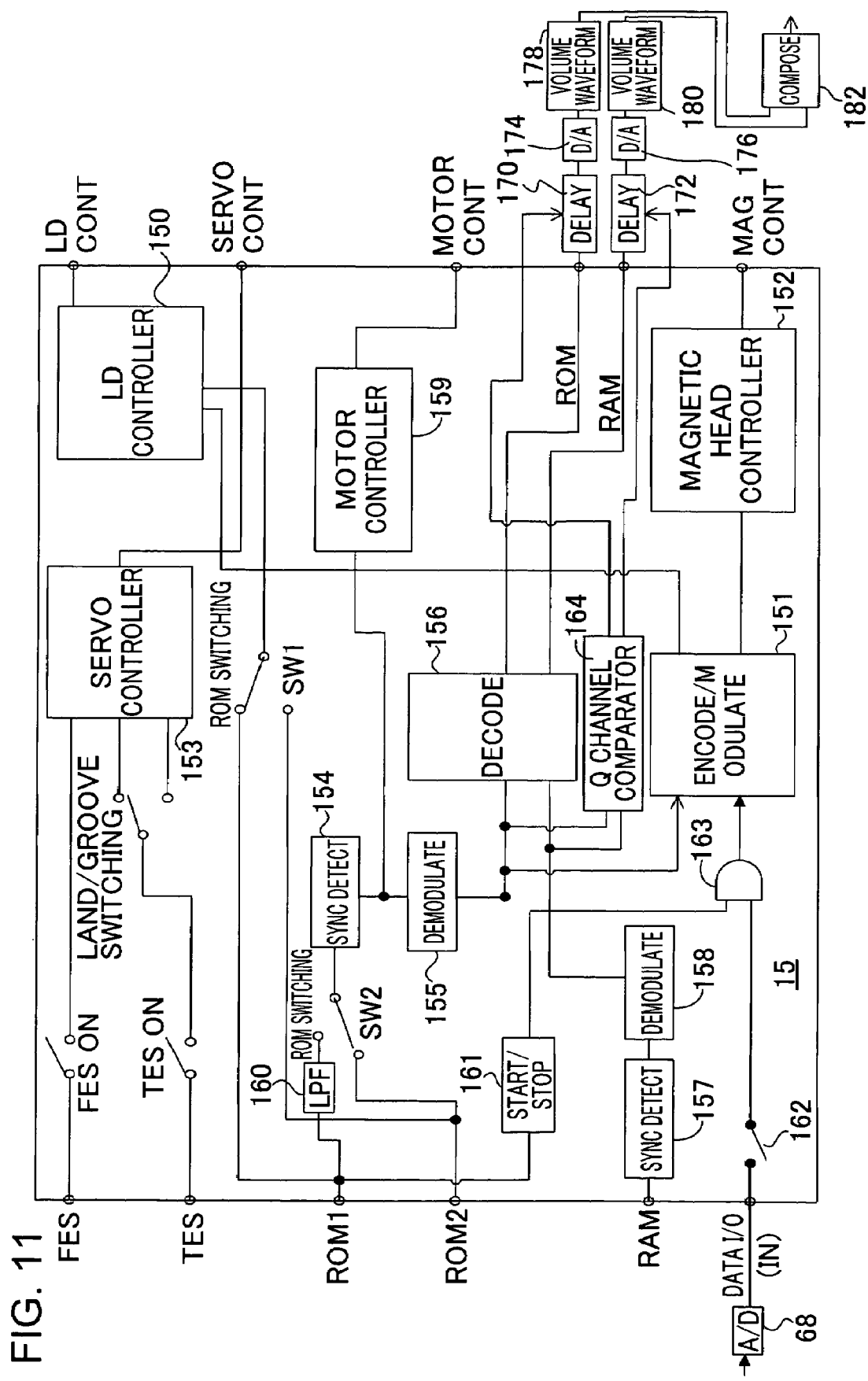
FIG. 11 is a block diagram depicting the second embodiment of the main controller in FIG. 8.
Figure 12:
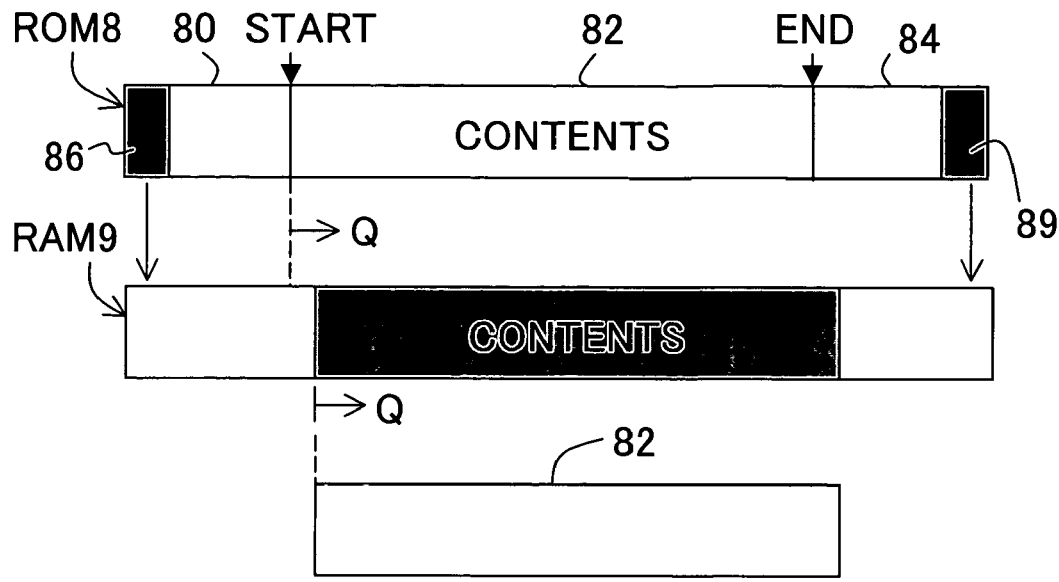
FIG. 12 is a diagram depicting the operation of the configuration in FIG. 11.

FIG. 11 is a block diagram depicting the second embodiment of the main controller 15 in FIG. 8, and FIG. 12 is an explanatory diagram thereof. In FIG. 11, composing elements the same as those in FIG. 10 are denoted with the same reference numerals.

To the main controller 15, the second ROM signal (ROM 2), first ROM signal (ROM 1) which is the output of the addition amplifier 59, RAM signal (RAM) which is the output of the differential amplifier 60, focus error signal (FES) from the FES generation circuit 54, and track error signal (TES) from the TES generation circuit 55 are input via the amplifier 61.

Also the recording data converted into digital audio signals is input between the main controller 15 and the data source 66 via the interface circuit 68 including the AD converter.

In the main controller 15, the output of the differential amplifier 60, which is RAM information when ROM information and RAM information are simultaneously regenerated, is synchronously detected by the synchronous detection circuit 157, demodulated using a demodulation method corresponding to NRZI modulation for example, by the demodulator 158, decoded by the decoder 156, and is output as digital audio RAM signals.

In the ROM/RAM simultaneous regeneration, on the other hand, the ROM 2 is used for ROM signals. The ROM 2 signals as well are synchronously detected by the synchronous detection circuit 154, just like the case of the RAM signals, converted into digital audio signals by the demodulator 155 and the decoder 156, and are output as ROM data.

As FIG. 12 shows, Q channel information, including time information, for the content 82 is recorded in the ROM 8, and Q channel information, including time information, is recorded in the RAM 9 in the same way. The Q channel comparator 164 compares the output of the Q channel information, including time information, added to the RAM signals, and the output of the Q channel information which is recorded in the ROM in advance, and as FIG. 12 shows, the regeneration output timings of the ROM data 82 and the RAM data are automatically adjusted using the delay units 170 and 172.

In ROM regeneration and RAM recording, ROM 1 signals are used as regenerated ROM signals, as shown in FIG. 9. By switching the switch SW2, the ROM 1 signals are synchronously detected by the synchronous detection circuit 154 via the low pass filter 160, converted into digital audio signals by the demodulator 155 and the decoder 156, and are output as ROM data.

The ROM data is converted into analog music signals by the D/A converter 174 via the delay unit 170, then is input to the sound volume and sound quality adjustment circuit 178, and is adjusted by the user according to an instruction of the adjustment section in FIG. 2. Then the adjusted data is synchronized by the synthesizer 182, and is output to the speaker and headphone 2A as music.

In order to record music, such as guitar and voice, to the RAM while listening to this music, the input switch 162 is first turned ON by the above mentioned multiple recording switch 97. Also the start instruction of the buffer 80 of the ROM area 8 is detected by the start/stop detection circuit 161, and the gate 163 is opened.

By this, the analog music signals, which are output from the guitar 2B and piano 2D, or voice signals, which are output from the microphone 2C, are converted into digital signals by the A/D converter 68. And encoding for error correction is performed by the encoder 151, then after adding Q channel information, including time information, according to the Q channel addition instruction as a timing signal of the ROM 1, the signals are converted into such signals as EFM and NRZI by the modulator 151. The magnetic head 35 is driven by the magnetic head controller 152 according to the converted signals, thereby the signals are recorded in the RAM section 9 of the recording medium 3.

Since input to RAM is enabled by the start instruction of the buffer 80 of the ROM area 8 and recording is ended by the end instruction, the positional relationship of recording between the content of the ROM and the content of the RAM is equalized, as shown in FIG. 12.

Also, as described in FIG. 7, the regeneration timing of the ROM data 82 and the recording timing of the RAM data can be synchronized by the Q channel addition control by the timing signal of the buffer 80 of the ROM area 8, and at regeneration the regeneration output of the RAM performance data (shaded portions in FIG. 12) by Q channel comparison can be performed at matched timing with the regeneration output of the ROM music. Therefore the effect of the virtual session function and the multiple recording function can be improved.

Figure 13:
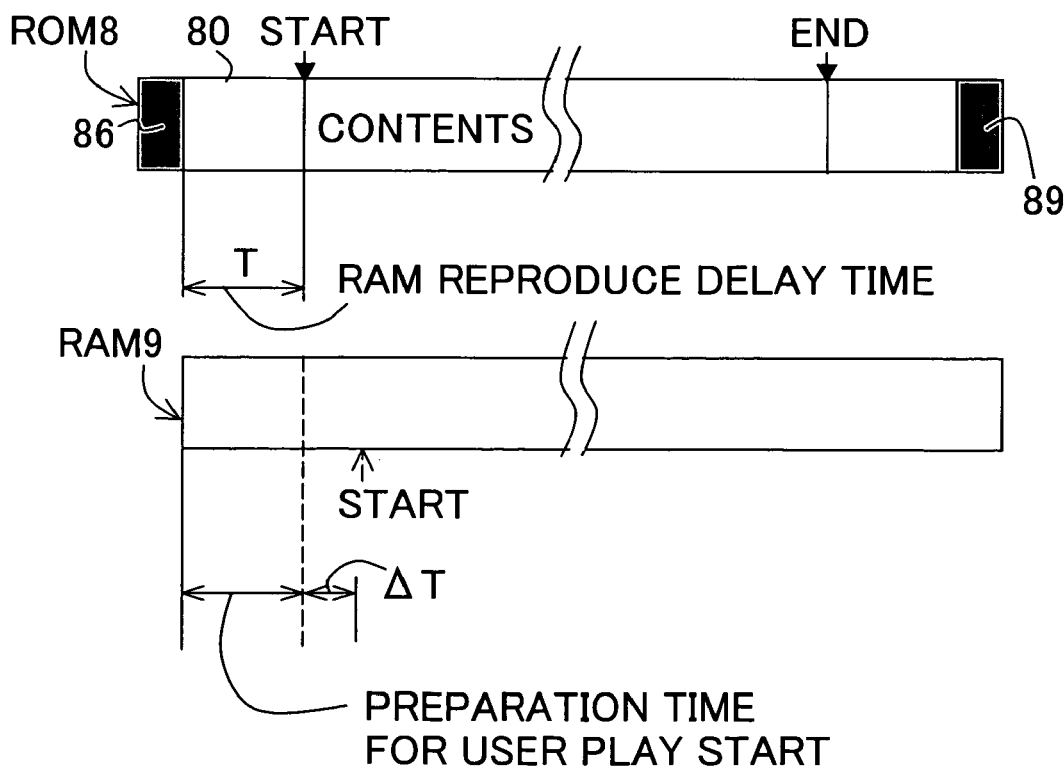
FIG. 13 is a diagram depicting another operation of the configuration in FIG. 11.

FIG. 13 is a diagram depicting another timing adjustment operation of the present invention. In the present embodiment, the Q channel comparator 164 is replaced by an extraction circuit, which extracts the recording timing delay time $\Delta T$ recorded in the buffer 80 of the ROM 8 in the configuration in FIG. 11.

As FIG. 13 shows, the recording timing delay time $\Delta T$, which is recorded in the buffer 80 of the ROM 8, is extracted, the delay amount of the delay unit 170 is adjusted according to a value, and at regeneration, the regeneration output of the RAM performance data (shaded portions in FIG. 12) can be performed at matched timing with the regeneration output of the ROM music, just like FIG. 12. Therefore the effect of the virtual session function and the multiple recording function can be improved.

OTHER EMBODIMENTS

The present invention was described above using embodiments, but the present invention can be modified in various ways within the scope of the essential character of the present invention, and these shall not be excluded from the technical scope of the present invention.

For example, as content, images can be used for ROM and voice or music can be used for RAM, or music or voice can be used for ROM and images can be used for RAM. Or images can be used for both ROM and RAM.

For the magneto-optical recording film, another optical recording/regeneration material can be used. Also the magneto-optical recording medium is not limited to a disk type, but may be a card type or other shapes. Also the present invention can be applied to the regeneration of RAM only.

INDUSTRIAL APPLICABILITY

Since the start and end of recording to RAM is controlled by the recording start and end signals of the ROM when data is recorded to RAM while regenerating the ROM using the concurrent ROM/RAM recording medium, the recording position of the content of RAM with respect to the content of ROM can be equalized and delay can be controlled. Also since recording to RAM is controlled using the timing signal of the ROM, the recording position of the content of RAM with respect to the content of ROM can be equalized, delay can be controlled even better, and simultaneous regeneration becomes possible at regeneration. By this, the virtual session function and the multiplex recording function, which have been limited to some specialists, can be implemented easily at low cost.

The invention claimed is:

1. A recording and regeneration device, comprising:
   an optical pickup for irradiating light onto a recording medium where a recording layer that is recordable and regeneratable optically is formed on a substrate in which first content information is recorded as phase pits using light reflectance changes, and separating and detecting the information of said phase pits and information of said recording layer;
   a magnetic recording head for recording information on said recording layer along with said irradiating light;
   a timing information detection circuit for detecting timing information added to said first content information from reproduced output of said phase pits;
   a controller for recording second content information, which is input along with the regeneration of said first content information, on said recording layer according to said detection of said timing information, and regenerating said first content information of said phase pits and said second content information of said recording layer from the optical pickup; and
   output mechanism for synthesizing and outputting said regenerated first and second content information with delaying at least one of said regenerated first and second content information.

2. The recording and regeneration device according to claim 1, wherein said controller detects signals for recording start and recording end of said second content, which is said added recording timing information, from said phase pit information, and controlling the recording start and the recording end of said second content information to said recording layer.

3. The recording and regeneration device according to claim 2, wherein said controller regenerates and outputs the signals to indicate the duration of time before regeneration start of said first content information included in said added recording timing information.

4. A recording and regenerating device comprising:
   an optical pickup for irradiating light onto a recording medium where a recording layer that is recordable and regeneratable optically is formed on a substrate in which first content information is recorded as phase pits using light reflectance changes, and separating and detecting the information of said phase pits and information of said recording layer;
   a magnetic recording head for recording information on said recording layer along with said irradiating light;
   a controller for recording second content information, which is input along with the regeneration of said first content information, on said recording layer according to recording timing information added to said first content information, and regenerating said first content information of said phase pits and said second content information of said recording layer from the optical pickup; and
   output mechanism for synthesizing and outputting said regenerated first and second content information with delaying at least one of said regenerated first and second content information;
   wherein said controller detects signals for the recording start and the recording end of said second content, which is said added recording timing information, from said phase pit information, and controlling the recording start and the recording end of said second content information to said recording layer; and
   wherein said controller adds the time information to said second content information to be recorded according to the signals to indicate the timing of said second content information included in said added timing information.

5. The recording and regenerating device according to claim 4, wherein said controller compares said timing signal of said phase pit information and said time information added to second content information of said recording layer and controls said delay amount of said synthesis output mechanism.

6. The recording and regenerating device according to claim 1, wherein said synthesis output mechanism further includes means for adjusting an output ratio of said regenerated first and second content information.

7. The recording and regenerating device according to claim 1, wherein said synthesis output mechanism further includes means for adjusting waveforms of at least one of said regenerated first and second content information.

8. The recording and regenerating device according to claim 1, wherein said first and second content information are music information convened into digital audio signals.

9. A recording and regenerating method, comprising the steps of:
   irradiating light onto a recording medium where a recording layer that is optically recordable and regeneratable is formed on a substrate in which first content information is recorded as phase pits using light reflectance changes;
   detecting timing information added to said first content information from reproduced output of said phase pits;
   recording second content information which is input along with the regeneration of said first content information of said phase pits on said recording layer according to said detected timing information; and
   regenerating said first content information of said phase pits and said second content information of said recording layer, and synthesizing and outputting said regenerated first and second content information while delaying at least one of said regenerated first and second content information.

10. The recording and regenerating method according to claim 9, wherein said recording step further includes a step of detecting signals for the recording start and the recording end of said second content, which is added recording timing information, and controlling the recording start and the recording end of said second content information to said recording layer.

11. The recording and regenerating method according to claim 10, wherein said recording step further includes a step of regenerating and outputting the signals to indicate the time until the regeneration start of said first content information included in said added recording timing information.

12. A recording and regenerating method comprising:
   irradiating light onto a recording medium where a recording layer that is optically recordable and regeneratable is formed on a substrate in which first content information is recorded as phase pits using light reflectance changes;

recording second content information which is input along with the regeneration of said first content information of said phase pits on said recording layer according to recording timing information added to said first content information; and regenerating said first content information of said phase pits and said second content information of said recording layer, and synthesizing and outputting said regenerated first and second content information with delaying at least one of said regenerated first and second content information;

wherein said recording step further includes a step of detecting signals for the recording start and the recording end of said second content, which is said added recording timing information, and controlling the recording start and the recording end of said second content information to said recording layer; and wherein said recording step further includes a step of adding the time information to said second content information to be recorded according to the signals to indicate the timing of said second content information included in said added timing information.

13. The recording and regeneration method according to claim 12, wherein said synthesis output step further includes a step of comparing said timing signals of said phase pit information and said time information added to second content information of said recording layer and controlling said delay amount of said synthesis output mechanism.

14. The recording and regeneration method according to claim 9, wherein said first and second content information is music information convened into digital audio signals.

* * * * *